(12) United States Patent
Sugaya

(10) Patent No.: US 10,645,297 B2
(45) Date of Patent: May 5, 2020

(54) SYSTEM, METHOD, AND PROGRAM FOR ADJUSTING ANGLE OF CAMERA

(71) Applicant: OPTiM Corporation, Saga-shi (JP)

(72) Inventor: Shunji Sugaya, Tokyo (JP)

(73) Assignee: OPTIM CORPORATION, Saga-shi (JP)

( * ) Notice: Subject to any disclaimer, the term of this patent is extended or adjusted under 35 U.S.C. 154(b) by 0 days.

(21) Appl. No.: 15/544,622

(22) PCT Filed: Sep. 30, 2016

(86) PCT No.: PCT/JP2016/078991
§ 371 (c)(1),
(2) Date: Jul. 19, 2017

(87) PCT Pub. No.: WO2018/061172
PCT Pub. Date: Apr. 5, 2018

(65) Prior Publication Data
US 2019/0215461 A1  Jul. 11, 2019

(51) Int. Cl.
*H04N 5/232* (2006.01)
*G06T 7/80* (2017.01)
(Continued)

(52) U.S. Cl.
CPC ......... *H04N 5/23296* (2013.01); *G03B 15/00* (2013.01); *G06T 7/80* (2017.01);
(Continued)

(58) Field of Classification Search
CPC .... H04N 5/23296; H04N 5/232; H04N 5/222; H04N 5/23299; H04N 5/23206;
(Continued)

(56) References Cited

U.S. PATENT DOCUMENTS 8,174,581 B2 * 5/2012 Nakamura ............ G01S 3/7864
348/169
9,070,289 B2 * 6/2015 Saund .................... G08G 1/054
(Continued)

FOREIGN PATENT DOCUMENTS

JP  2006-113358  4/2006
JP  2012-239194  12/2012
(Continued)

*Primary Examiner* — Wesley J Tucker
(74) *Attorney, Agent, or Firm* — Lex IP Meister, PLLC

(57) ABSTRACT

The present invention is to provide a system, a method, and a program for adjusting the angle of a camera that are capable to automatically adjust the angle formed by an imaging device to an object. The system for adjusting the angle of a camera 1 acquires an image taken by a camera 200; acquires the three-dimensional angle of the camera 200; analyzes an object in the image; and associates and stores the analyzed object with the acquired angle of the camera. Furthermore, the system for adjusting the angle of a camera 1 receives a request to image an object, extracts the stored angle of the camera in response to the request, and adjusts the angle of the camera 200 to the extracted angle. Still furthermore, the system for adjusting the angle of a camera 1 identifies a constant area of plane as the object based on the result of the image analysis and adjusts the angle of the camera 200 to an angle parallel to the plane based on the result of the identified plane.

3 Claims, 9 Drawing Sheets

(51) Int. Cl.
*G03B 15/00* (2006.01)
*H04N 5/222* (2006.01)
*G03B 17/56* (2006.01)

(52) U.S. Cl.
CPC .............. *H04N 5/222* (2013.01); *H04N 5/232* (2013.01); *G03B 17/561* (2013.01); *G03B 2206/00* (2013.01)

(58) Field of Classification Search
CPC ........ G06T 7/80; G03B 15/00; G03B 17/561; G03B 2206/00
See application file for complete search history.

(56) References Cited

U.S. PATENT DOCUMENTS

| | | | |
|---|---|---|---|
| 9,094,615 B2* | 7/2015 | Aman | H04N 5/262 |
| 9,367,067 B2* | 6/2016 | Gilmore | G05D 1/101 |
| 9,567,078 B2* | 2/2017 | Zang | G05D 1/0038 |
| 9,769,387 B1* | 9/2017 | Beard | G06K 9/0063 |
| 9,854,155 B1* | 12/2017 | Sikka | H04N 5/23216 |
| 2001/0005204 A1* | 6/2001 | Matsumoto | G06T 15/04 345/418 |
| 2002/0076085 A1* | 6/2002 | Shimazu | A63F 13/12 382/100 |
| 2012/0154599 A1* | 6/2012 | Huang | H04N 5/232 348/169 |
| 2015/0077578 A1 | 3/2015 | Iwasaki | |
| 2016/0180510 A1* | 6/2016 | Grau | G06T 7/80 348/47 |
| 2016/0273921 A1* | 9/2016 | Zhou | G01S 19/49 |

FOREIGN PATENT DOCUMENTS

| | | |
|---|---|---|
| JP | 2014-225819 | 12/2014 |
| JP | 2015-56846 | 3/2015 |

* cited by examiner

SYSTEM, METHOD, AND PROGRAM FOR ADJUSTING ANGLE OF CAMERA

TECHNICAL FIELD

The present invention relates to a system, a method, and a program for adjusting the angle of a camera.

BACKGROUND ART

In recent years, there has been a computer system in which an imaging device connected with a public line network, etc., takes an image such as a still or moving image of a target object and transmits the taken image to a terminal device that exists in a remote place. In such a computer system, whether or not the object is imaged at an appropriate angle depends on the angle of the imaging device at the time of imaging. For example, if an object is to be imaged from the horizontal direction but the imaging device actually turns to a completely different direction, the computer system should turn the camera to the horizontal direction. Especially, if the imaging device is a moving vehicle such a drone, the imaging device hardly adjusts the angle of the camera when imaging an object. This is because the angle formed by the camera to a horizontal line on the object is changed at every imaging.

As such a computer system, the constitution that superimposes an object for calibration on an image taken by an imaging device attached to a moving vehicle and calibrates the position of the imaging device based on the movement distance and the rotation angle of the object for calibration is disclosed (refer to Patent Document 1).

CITATION LIST

Patent Literature

Patent Document 1: JP 2014-225819 A

SUMMARY OF INVENTION

However, the constitution of Patent Document 1 should turn the angle of a camera to the horizontal direction whenever imaging an object.

An objective of the present invention is to provide a system, a method, and a program for adjusting the angle of a camera that are capable to automatically adjust the angle formed by an imaging device to an object.

The present invention provides a system for adjusting the angle of a camera, including:

an image acquisition unit that acquires an image taken by a camera;

a camera angle acquisition unit that acquires the three-dimensional angle of the camera;

an image analysis unit that analyzes an object in the image; and a camera angle storing unit that associates and stores the analyzed object with the acquired angle of the camera.

According to the present invention, the system for adjusting the angle of a camera acquires an image taken by a camera; acquires the three-dimensional angle of the camera; analyzes an object in the image; and associates and stores the analyzed object with the acquired angle of the camera.

The present invention is the category of a system for adjusting the angle of a camera, but the categories of a method, a program, etc., for adjusting the angle of a camera have similar functions and effects.

The present invention can provide a system, a method, and a program for adjusting the angle of a camera that are capable to automatically adjust the angle formed by an imaging device to an object.

DESCRIPTION OF EMBODIMENTS

Embodiments of the present invention will be described below with reference to the attached drawings. However, these are illustrative only, and the technological scope of the present invention is not limited thereto.

Overview of System for Adjusting the Angle of a Camera 1

Figure 1:
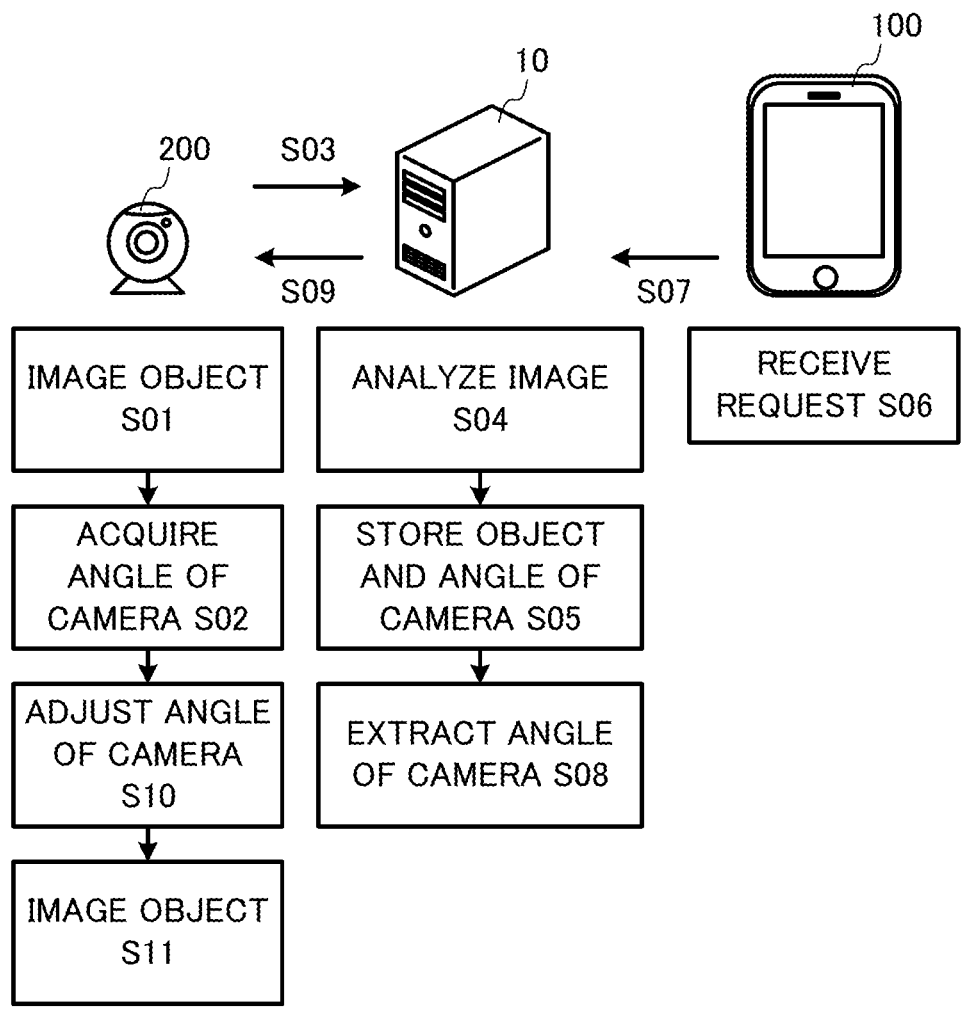
FIG. 1 shows a schematic diagram of the system for adjusting the angle of a camera 1.

The overview of the present invention will be described below with reference to FIG. 1. FIG. 1 shows an overview of the system for adjusting the angle of a camera 1 according to a preferable embodiment of the present invention. The system for adjusting the angle of a camera 1 includes a computer 10, an information terminal 100, and a camera 200.

In FIG. 1, the numbers of the information terminals 100 and the cameras 200 are not be limited to one and may be two or more. Furthermore, the computer 10 and the information terminal 100 are not be limited to actual devices and may be virtual devices. The processes to be described later may be achieved by any one of or in combination of any two or more of the computer 10, the information terminal 100, and the camera 200.

The computer 10 is a computer device that is capable of data communication with the information terminal 100 and the camera 200.

The terminal 100 is a terminal device that is capable of data communication with the computer 10. Examples of the information terminal 100 include electrical appliances such as a mobile phone, a mobile information terminal, a tablet terminal, a personal computer, a net book terminal, a slate terminal, an electronic book terminal, and a portable music player, and wearable terminals such as smart glasses and a head mounted display.

The camera 200 is provided with imaging devices such as an imaging element and a lens, which is capable of data communication with the computer 10. The camera 200 is also capable to image an object from two or more different directions at the same time.

The camera 200 takes an image such as a still or moving image of a target object (Step S01). The camera 200 images a landscape, an article, a crop, a tree, etc., as an object.

The camera 200 acquires the location when took an image as its own three-dimensional angle (Step S02).

The camera 200 transmits the image taken by the camera 200 itself and the image data indicating the angle of the camera 200 to the computer 10 (Step S03).

The computer 10 receives the image data. The computer 10 analyzes an object contained in the image data (Step S04). The computer 10 extracts and identifies an object by extracting a feature amount existing in the image.

The computer 10 associates and stores the analyzed object with the angle of the camera 200 (Step S05).

The information terminal 100 receives a request to image an object (Step S06). Examples of the request include imaging an object and specifying a camera 200.

The information terminal 100 transmits the received request data indicating the received request to the computer 10 (Step S07).

The computer 10 receives the received request data. The computer 10 identifies the object to be imaged based on the received request data and extracts the angle of the camera 200 associated with this object (Step S08).

The computer 10 transmits a request to image the object and imaging request data indicating the extracted angle of the camera 200 to the camera 200 (Step S09).

The camera 200 receives the imaging request data. The camera 200 adjusts its angle to the angle extracted by the computer 10 based on the imaging request data (Step S10).

The camera 200 images the object at the adjusted angle (Step S11).

The camera 200 may recognize that the object is a constant area of plane and adjust its angle to an angle parallel to this plane.

The camera 200 transmits the image data indicating the image of the object to the computer 10. The computer 10 receives the image data and transmits the image data to the information terminal 100. The information terminal 100 receives the image data and displays the image on the display unit of the information terminal 100 itself based on the image data.

The system for adjusting the angle of a camera 1 may include an information terminal 100 and a camera 200. In this case, the processes that the computer 10 performs only have to be achieved by any one of the information terminal 100 and the camera 200 or the both. The system for adjusting the angle of a camera 1 may include a computer 10 and a camera 200. In this case, the processes that the information terminal 100 performs only have to be achieved by the computer 10 or the camera 200.

Configuration of System for Adjusting the Angle of a Camera 1

Figure 2:
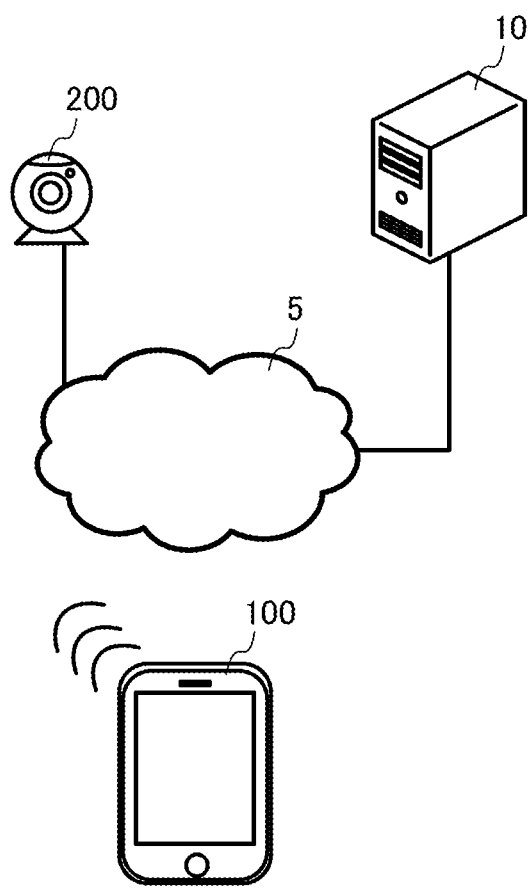
FIG. 2 shows an overall configuration diagram of the system for adjusting the angle of a camera 1.

The configuration of the system for adjusting the angle of a camera 1 will be explained with reference to FIG. 2. FIG. 2 shows a block diagram illustrating the system for adjusting the angle of a camera 1 according to a preferable embodiment of the present invention. The system for adjusting the angle of a camera 1 includes a computer 10, an information terminal 100, a camera 200, and a public line network 5 (e.g. the Internet network, a third and a fourth generation networks).

The number of the information terminals 100 or the cameras 200 is not be limited to one and may be two or more. The computer 10 or the information terminal 100 is not be limited to an actual device and may be a virtual device. The processes to be described later may be achieved by any one of or in combination of any two or more of the computer 10, the information terminal 100, and the camera 200.

The computer 10 is the above-mentioned computer device with the functions to be described later.

The information terminal 100 is the above-mentioned terminal device with the functions to be described later.

The camera 200 is the above-mentioned imaging device with the functions to be described later.

Functions

Figure 3:
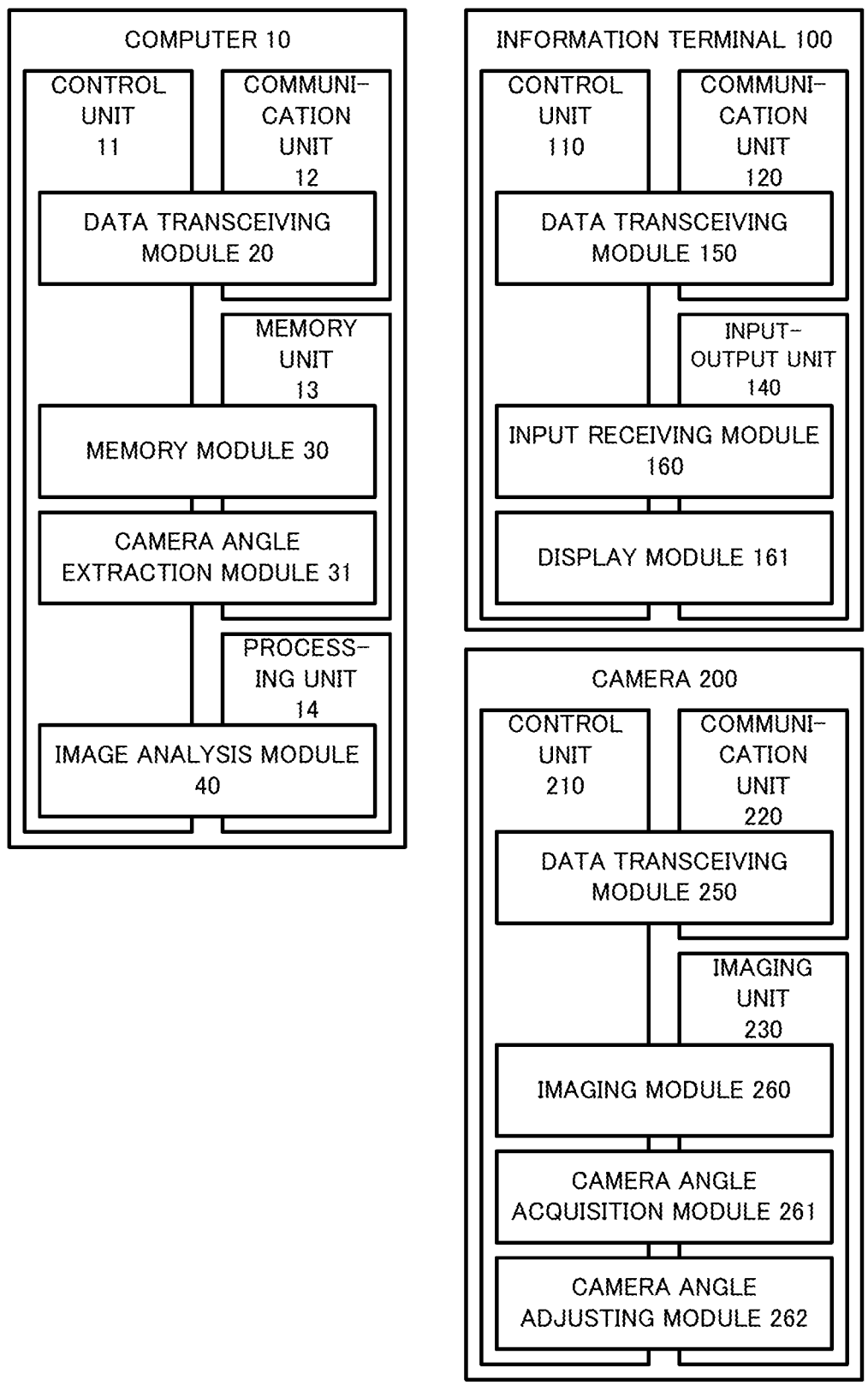
FIG. 3 shows a functional block diagram of the computer 10, the information terminal 100, and the camera 200.

The functions of the system for adjusting the angle of a camera 1 will be explained with reference to FIG. 3. FIG. 3 shows a functional block diagram of the computer 10, the information terminal 100, and the camera 200.

The computer 10 includes a control unit 11 provided with a central processing unit (hereinafter referred to as "CPU"), a random access memory (hereinafter referred to as "RAM"), and a read only memory (hereinafter referred to as "ROM"); and a communication unit 12 such as a device that is capable to communicate with other devices, for example, a Wireless Fidelity or Wi-Fi® enabled device complying with IEEE 802.11. The computer 10 also includes a memory unit 13 such as a hard disk, a semiconductor memory, a record medium, or a memory card to store data. The computer 10 also includes a processing unit 14 provided with various analysis devices for image analysis, etc.

In the computer 10, the control unit 11 reads a predetermined program to achieve a data transceiving module 20 in cooperation with the communication unit 12. Furthermore, in the computer 10, the control unit 11 reads a predetermined program to achieve a memory module 30 and a camera angle extraction module 31 in cooperation with the memory unit 13. Still furthermore, in the computer 10, the control unit 11 reads a predetermined program to achieve an image analysis module 40 in cooperation with the processing unit 14.

The information device 100 includes a control unit 110 including a CPU, a RAM, and a ROM; and a communication unit 120 such as a Wi-Fi® enabled device that is capable to communicate with other devices, in the same way as the computer 10. The information terminal 100 also includes an input-output unit 140 including a display unit that outputs and displays data and images processed by the control unit 110 and an input unit such as a touch panel, a keyboard, or a mouse that receive an input from the user.

In the information terminal 100, the control unit 110 reads a predetermined program to achieve a data transceiving module 150 in cooperation with the communication unit 120. Furthermore, in the information terminal 100, the control unit 110 reads a predetermined program to achieve an input receiving module 160 and a display module 161 in cooperation with the input-output unit 140.

The camera 200 includes a control unit 210 including a CPU, a RAM, and a ROM; and a communication unit 220 such as a device that is capable to communicate with other devices, in the same way as the computer 10. The camera 200 also includes an imaging unit 230 provided with two or more imaging devices such as imaging elements and lenses that are capable to image an object in two or more different directions and a device for adjusting the angle of the camera 200 itself.

In the camera 200, the control unit 210 reads a predetermined program to achieve a data transceiving module 250 in cooperation with the communication unit 220. Furthermore, in the user terminal 200, the control unit 210 reads a predetermined program to achieve an imaging module 260, a camera angle acquisition module 261, and a camera angle adjusting module 262 in cooperation with the imaging unit 230.

In the following description, there are one information terminal 100 and one camera 200. Needless to say, the processes can be performed even if there are two or more information terminals 100 and cameras 200.

Camera Angle Storing Process

Figure 4:
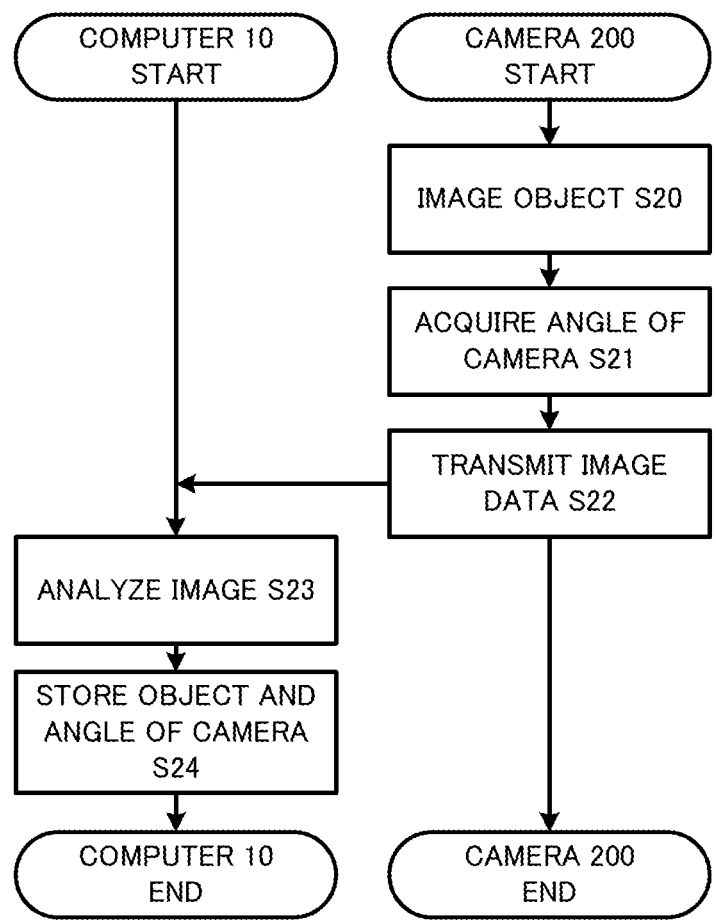
FIG. 4 shows a flow chart illustrating the camera angle storing process according to the first embodiment that the computer 10 and the camera 200 perform.

The camera angle storing process according to the first embodiment that the system for adjusting the angle of a camera 1 performs will be explained with reference to FIG. 4. FIG. 4 shows a flow chart illustrating the camera angle storing process according to the first embodiment that the computer 10 and the camera 200 perform. The tasks executed by the modules of each of the above-mentioned devices will be explained below together with this process.

The first embodiment is one example where the camera 200 in the system for adjusting the angle of a camera 1 is fixed at a certain position.

The imaging module 260 takes an image such as a still or moving image of a target object (Step S20). In the step S20, the imaging module 260 images a landscape, an article, a crop, a tree, etc., as an object. The image that the imaging module 260 takes is a taken image. The imaging module 260 is assumed to image an object from a previously set imaging location.

The camera angle acquisition module 261 acquires the angle of the camera 200 (Step S21). In the step S21, the camera angle acquisition module 261 acquires the location when taking an image as the three-dimensional angle of the camera 200.

The data transceiving module 250 transmits the taken image and the image data indicating the angle of the camera 200 to the computer 10 (Step S22). If there are two or more cameras 200 in the system for adjusting the angle of a camera 1, the data transceiving module 250 may transmit the taken image data, including the identifier of each camera 200. The identifier of the camera 200 is information to uniquely identify the camera 200, for example, an IP address, a MAC address, a serial number, and an equipment number.

The data transceiving module 20 receives the taken image data. The computer 10 acquires the image taken by a camera 200 and the three-dimensional angle of the camera 200 by receiving the taken image data.

The image analysis module 40 analyzes the image based on the taken image data (Step S23). In the step S23, the image analysis module 40 extracts the feature amount contained in the image. The image analysis module 40 identifies and extracts an object contained in the image based on the extracted feature amount.

The memory module 30 associates and stores the extracted object with the acquired angle of the camera 200 (Step S24). In the step S24, if there are two or more extracted objects, the memory module 30 associates and stores each object with the angle of the camera 200. If there are two or more cameras 200 in the system for adjusting the angle of a camera 1, the memory module 30 may associate and store the identifier of each camera 200 with the each object and the angle of the each camera 200.

Camera Angle Storing Process

Figure 5:
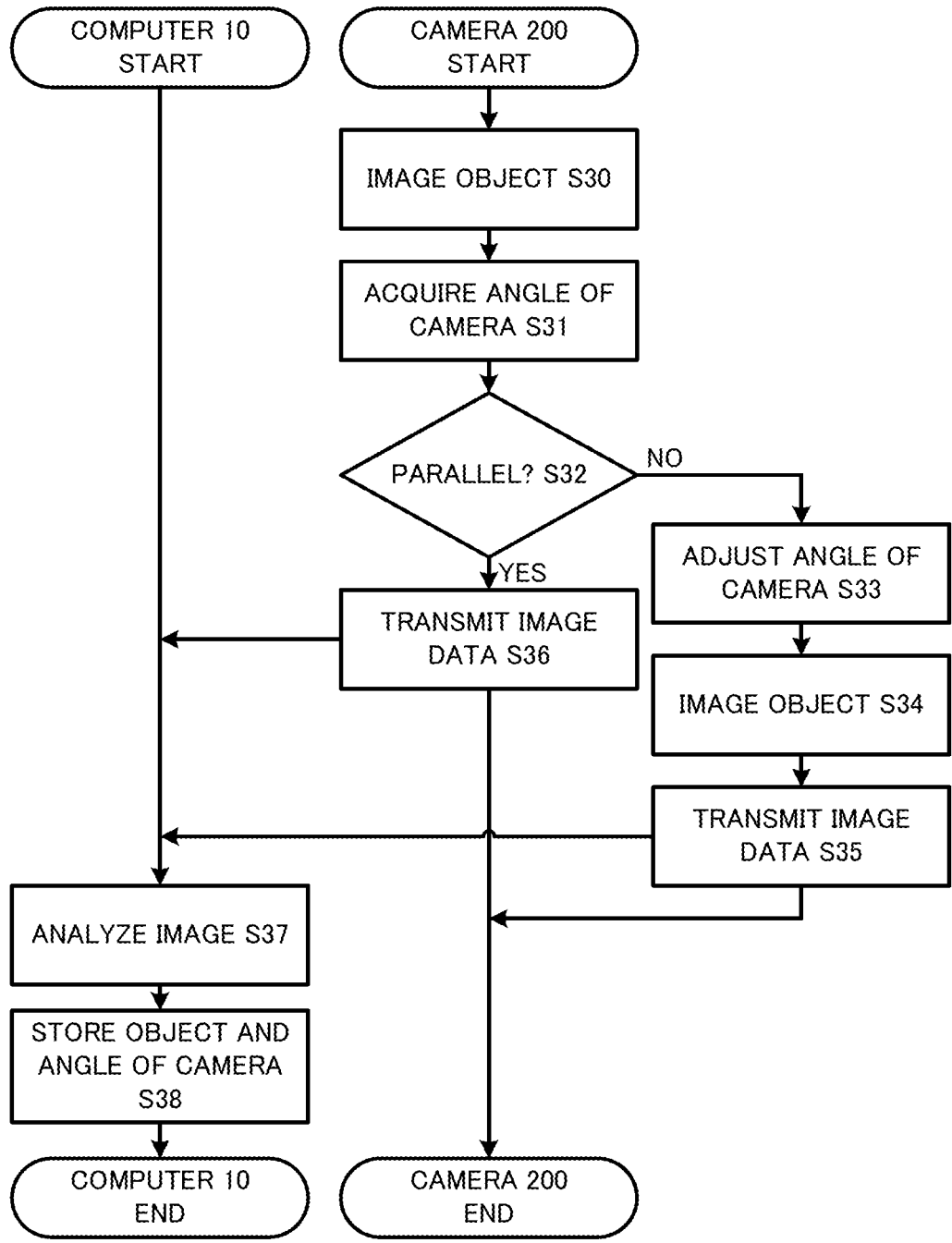
FIG. 5 shows a flow chart illustrating the camera angle storing process according to the second embodiment that the computer 10 and the camera 200 perform.

The camera angle storing process according to the second embodiment that the system for adjusting the angle of a camera 1 performs will be explained with reference to FIG. 5. FIG. 5 shows a flow chart illustrating the camera angle storing process according to the second embodiment that the computer 10 and the camera 200 perform. The tasks executed by the modules of each of the above-mentioned devices will be explained below together with this process.

The second embodiment is one example where the camera 200 in the system for adjusting the angle of a camera 1 is provided in a moving vehicle such as a drone.

The imaging module 260 takes an image such as a still or moving image of a target object (Step S30). In the step S30, the imaging module 260 images a landscape, an article, a crop, a tree, etc., as an object. The image that the imaging module 260 takes is a taken image.

The camera angle acquisition module 261 analyzes the taken image and acquires the angle of the camera 200 (Step S31). In the step S31, the camera angle acquisition module 261 recognizes the maximum area with a same pattern in an image as a plane such as a floor or a ground. The camera angle acquisition module 261 acquires the angle of the camera 200 based on the inclination of the plane.

Figure 9:
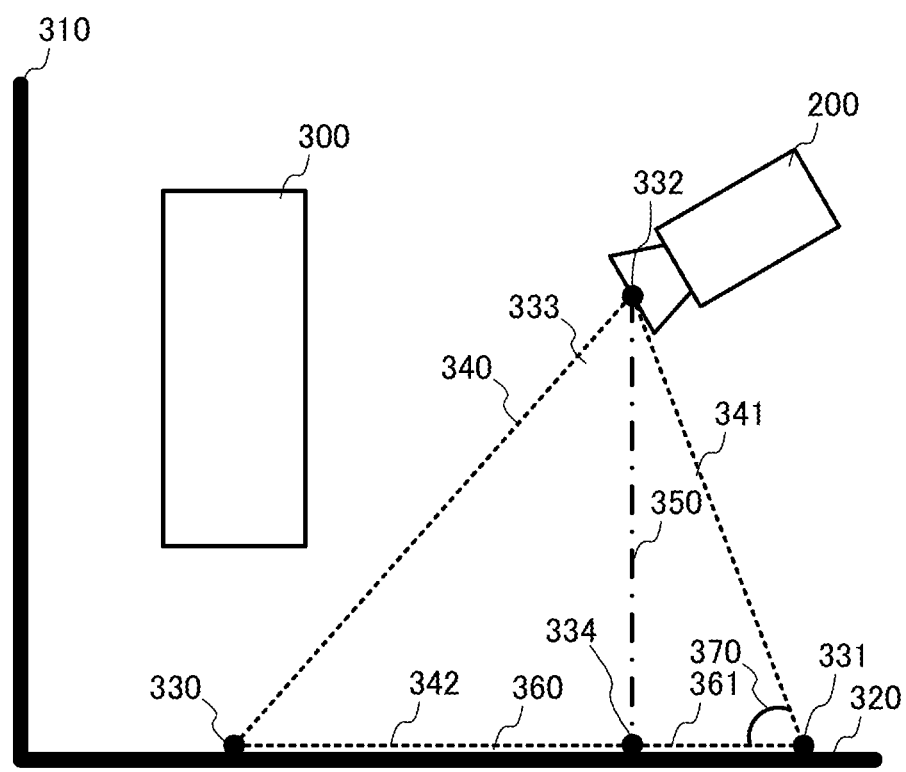
FIG. 9 schematically shows how the camera 200 acquires its angle.

How the camera angle acquisition module 261 acquires the angle of a camera 200 will be explained below with reference to FIG. 9. FIG. 9 schematically shows how the camera angle acquisition module 261 acquires the angle of a camera 200. In FIG. 9, the camera 200 is imaging an object 300, a wall 310, and a floor 320. The above-mentioned plane corresponds to the floor 320.

The camera angle acquisition module 261 extracts two predetermined positions 330, 331 on the floor 320 as samples. The camera angle acquisition module 261 connects the predetermined positions 330,331 and the center position 332 of the imaging location to form a triangle 333. The triangle 333 has three sides 340 to 342. The camera angle acquisition module 261 forms a perpendicular line 350 from the center position 332 to the floor 320 and then the intersection point 334 of the side 342 with the perpendicular line 350. The camera angle acquisition module 261 calculates the lengths of the sides 340,341 and the perpendicular line 350. The camera angle acquisition module 261 learns the length of the difference between the images taken by a right and a left cameras and an actual distance, estimates the distance, and then calculates the lengths of the sides 340,341 and the perpendicular line 350. The camera angle acquisition module 261 calculates the lengths of the line segment 360 connecting the predetermined position 330 with the intersection point 334 and the line segment 361 connecting the predetermined position 331 with the intersection point 334 in the side 342. The camera angle acquisition module 261 calculates the angle 370 by trigonometric substitution. The camera angle acquisition module 261 acquires this angle 370 as the three-dimensional angle of the camera 200. This angle 370 is approximately equal to the angle between the camera 200 and its position. As a result, the camera angle acquisition module 261 acquires the three-dimensional angle of the camera 200 by acquiring the value of this angle 370.

The camera angle acquisition module 261 may acquire the angle of the camera 200 by a method that is not limited to the above-mentioned example.

The camera angle adjusting module 262 judges whether or not the angle of the camera 200 is an angle parallel to the plane (Step S32). In the step S32, the camera angle adjusting module 262 judges whether or not the value of the above-mentioned angle 370 is 0.

If judging that the angle of the camera 200 is not an angle parallel to the plane (NO) in the step S32, the camera angle adjusting module 262 adjusts the angle of the camera 200 to an angle parallel to the ground (Step S33). In the step S33, the camera angle adjusting module 262 drives various devices attached to a moving vehicle to adjust the angle of the camera 200

The imaging module 260 images an object (Step S34). The step S34 is processed in the same way as the above-mentioned step S30.

The data transceiving module 250 transmits the taken image and the image data indicating the angle of the camera 200 to the computer 10 (Step S35).

If judging that the angle of the camera 200 is an angle parallel to the plane (YES) in the step S32, the data transceiving module 250 transmits the taken image and the image data indicating the angle of the camera 200 to the computer 10 (Step S36).

In the steps S35 and S36, if there are two or more cameras 200 in the system for adjusting the angle of a camera 1, the data transceiving module 250 may transmit the taken image data, including the identifier of each camera 200.

The data transceiving module 20 receives the taken image data. The computer 10 acquires the image taken by a camera 200 and the three-dimensional angle of the camera 200 by receiving the taken image data.

The image analysis module 40 analyzes the image based on the taken image data (Step S37). The step S37 is processed in the same way as the above-mentioned step S23.

The memory module 30 associates and stores the extracted object with the acquired angle of the camera 200 (Step S38). The step S38 is processed in the same way as the above-mentioned step S24.

Camera Angle Adjusting Process

Figure 6:
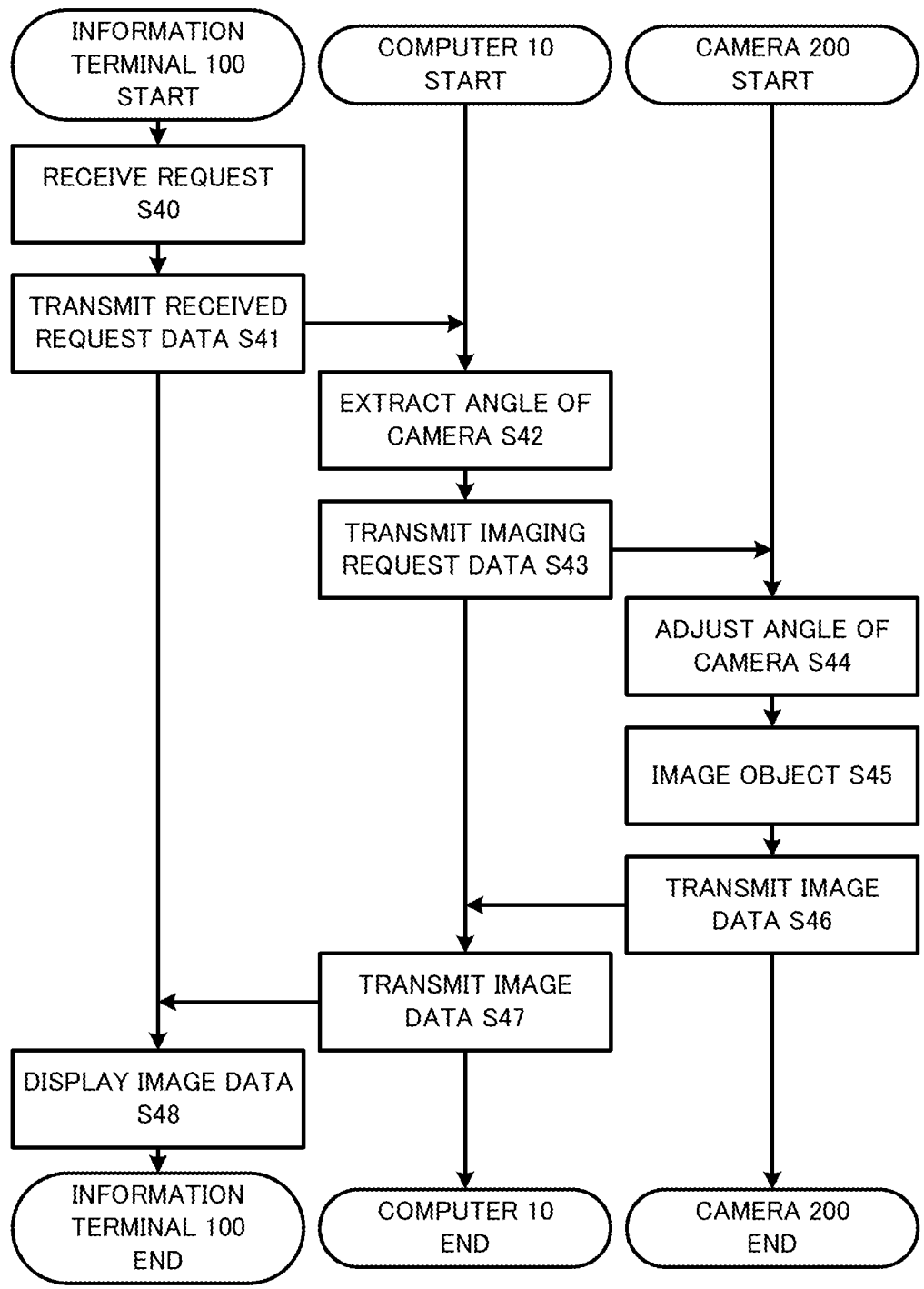
FIG. 6 shows a flow chart illustrating the camera angle adjusting process according to the first embodiment that the computer 10, the information terminal 100, and the camera 200 perform.

The camera angle adjusting process according to the first embodiment that the system for adjusting the angle of a camera 1 performs will be explained with reference to FIG. 6. FIG. 6 shows a flow chart illustrating the camera angle adjusting process according to the first embodiment that the computer 10, the information terminal 100, and the camera 200 perform. The tasks executed by the modules of each of the above-mentioned devices will be explained below together with this process.

The input receiving module 160 receives a request to image an object (Step S40). In the step S40, the input receiving module 160 receives an input of the name, the characteristics, etc., of an object and an input to specify the camera 200 to receive a request.

The data transceiving module 150 transmits the received request data indicating the received input request to the computer 10 (Step S41).

The data transceiving module 20 receives the input request data. The camera angle extraction module 31 identifies the object based on the received request data and extracts the angle of the camera 200 associated with the identified object (Step S42). In the step S42, the camera angle extraction module 31 references an object stored in the memory module 30 based on the object included in the input request data and then extracts the angle of the camera 200 associated with this referenced object.

The data transceiving module 20 transmits the identified object and imaging request data indicating the angle of the camera 200 that is associated with this object to the camera 200 (Step S43).

The data transceiving module 250 receives the imaging request data. The camera angle adjusting module 262 adjusts the angle of the camera 200 based on the imaging request data (Step S44). In the step S44, the camera angle adjusting module 262 acquires the angle of the camera 200 that is contained in the imaging request data, compares the acquired angle of the camera 200 with the current angle of the camera 200, and adjusts the angle of the camera 200 to the acquired angle. In the step S44, the camera angle adjusting module 262 drives various attached devices to adjust the angle of the camera 200.

The imaging module 260 images an object at the adjusted angle of the camera 200 (Step S45).

The data transceiving module 250 transmits the image data indicating the image of the object to the computer 10 (Step S46).

The data transceiving module 20 receives the image data and transmits the received image data to the information terminal 100 (Step S47).

The data transceiving module 150 receives the image data. The display module 161 displays the image based on the received image data (Step S48).

Camera Angle Adjusting Process

Figure 7:
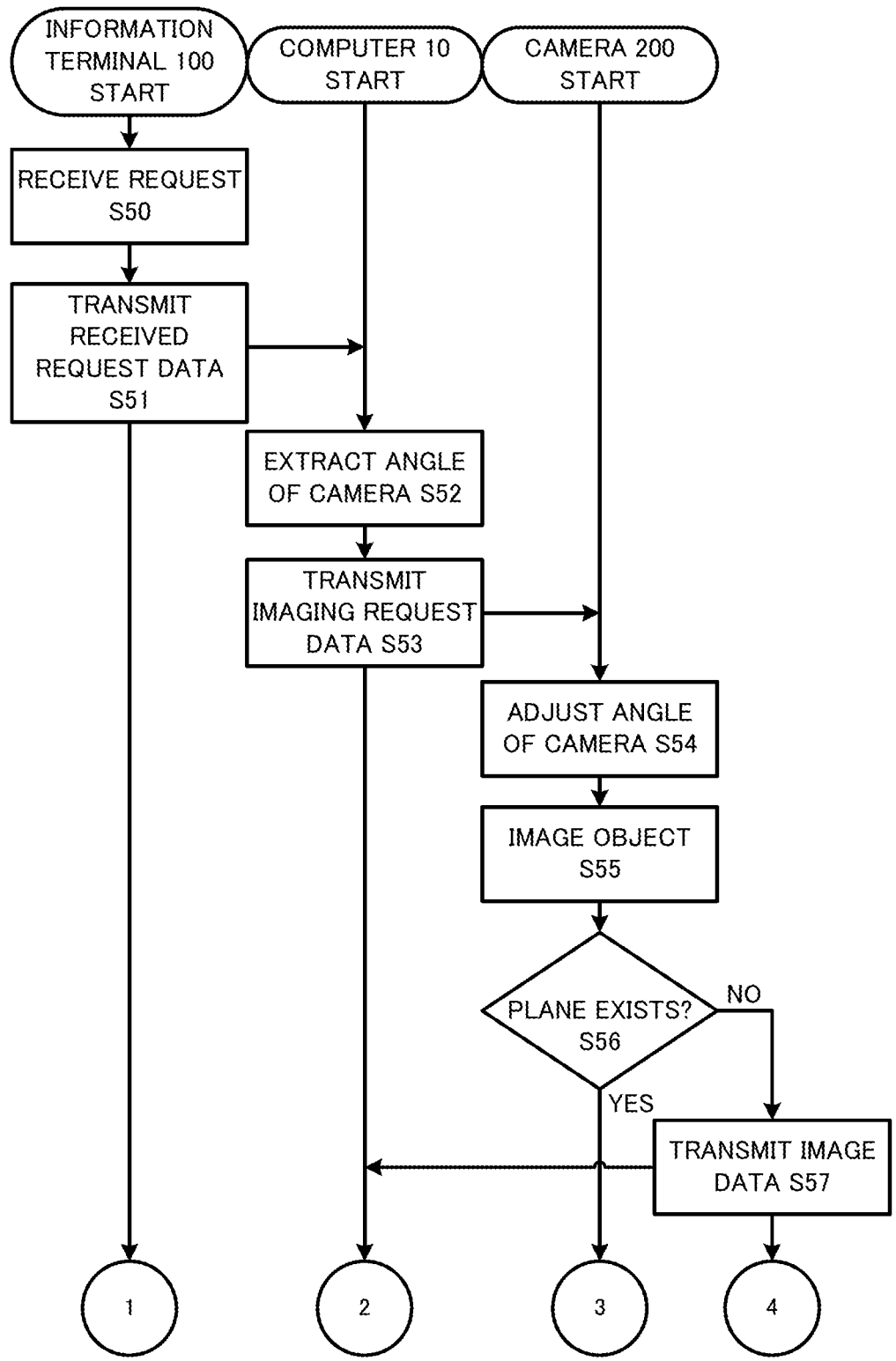
FIG. 7 shows a flow chart illustrating the camera angle adjusting process according to the second embodiment that the computer 10, the information terminal 100, and the camera 200 perform.
Figure 8:
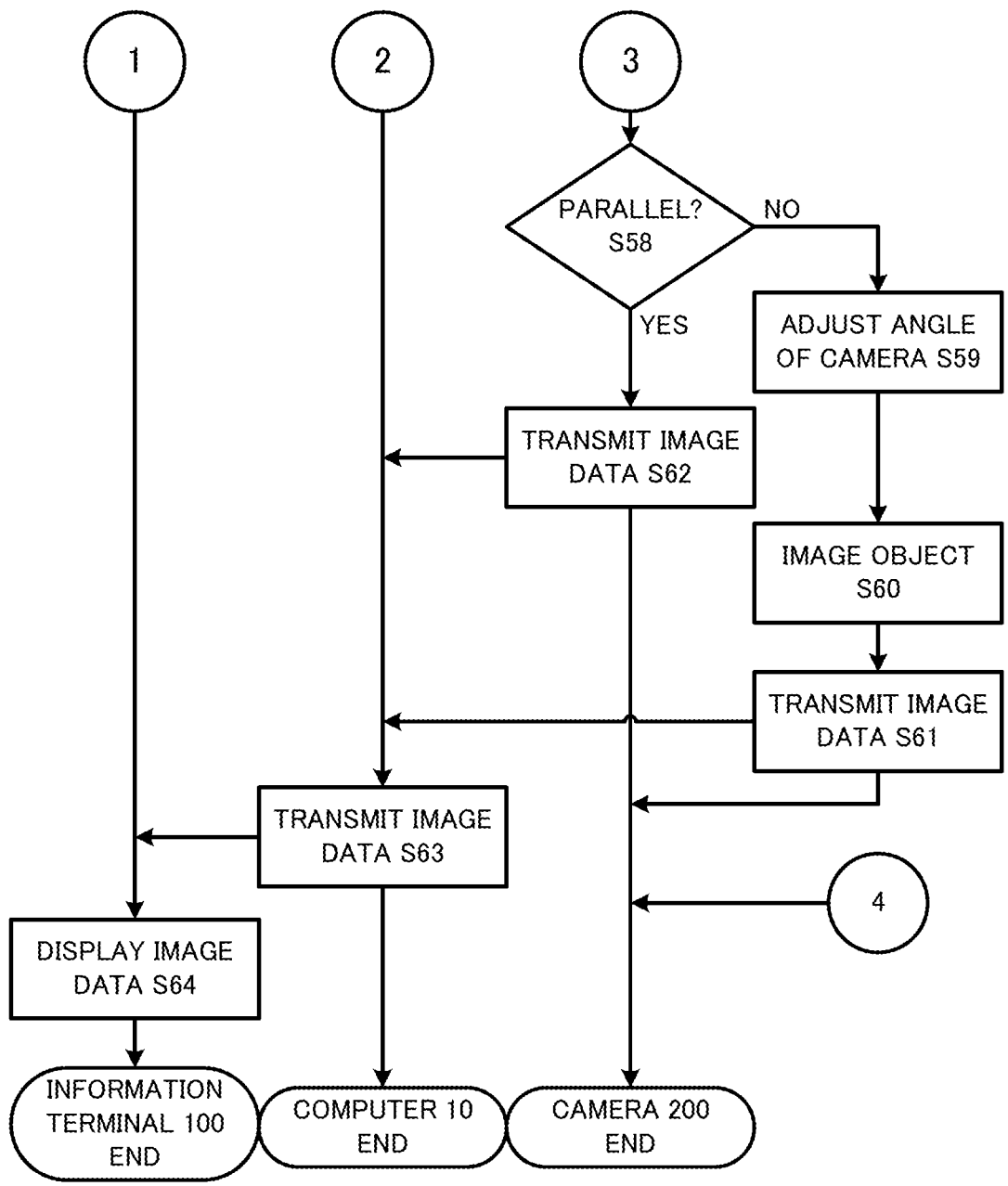
FIG. 8 shows a flow chart illustrating the camera angle adjusting process according to the second embodiment that the computer 10, the information terminal 100, and the camera 200 perform.

The camera angle adjusting process according to the second embodiment that the system for adjusting the angle of a camera 1 performs will be explained with reference to FIGS. 7 and 8. FIGS. 7 and 8 show a flow chart illustrating the camera angle adjusting process according to the second embodiment that the computer 10, the information terminal 100, and the camera 200 perform. The tasks executed by the modules of each of the above-mentioned devices will be explained below together with this process.

The system for adjusting the angle of a camera 1 performs the process similar to the above-mentioned steps S40 to S45 (Steps S50 to S55).

The camera angle acquisition module 261 analyzes the taken image and judges whether or not a plane exists (Step S56). In the step S56, the camera angle acquisition module 261 judges whether or not to recognize a plane that exists in the image through the process similar to the above-mentioned step S31.

If the camera angle acquisition module 261 judges that a plane does not exist (NO) in the step S56, the data transceiving module 250 transmits the image data indicating the image of an imaged object to the computer 10 (Step S57) In the step S57, the data transceiving module 250 transmits the image data on an object imaged in the step S55 to the computer 10.

On the other hand, if the camera angle acquisition module 261 judges that a plane exists (YES) in the step S56, the camera angle adjusting module 262 judges whether or not the angle of the camera 200 is an angle parallel to the plane (Step S58). The step S58 is processed in the same way as the above-mentioned step S32.

If judging that the angle of the camera 200 is not an angle parallel to this plane (NO) in the step S58, the camera angle adjusting module 262 adjusts the angle of the camera 200 to an angle parallel to the plane (Step S59). The step S59 is processed in the same way as the above-mentioned step S33.

The imaging module 260 images an object (Step S60). The step S60 is processed in the same way as the above-mentioned step S45.

The data transceiving module 250 transmits the image data indicating the image of the object to the computer 10 (Step S61).

If the camera angle adjusting module 262 judges that the angle of the camera 200 is an angle parallel to the plane (YES) in the step S58, the data transceiving module 250 transmits the image data indicating the image of the imaged object to the computer 10 (Step S62). In the step S62, the data transceiving module 250 transmits the image data on an object imaged in the step S55 to the computer 10.

The data transceiving module 20 receives the image data and transmits the received image data to the information terminal 100 (Step S63).

The data transceiving module 150 receives the image data. The display module 161 displays the image based on the received image data (Step S64).

In the above-mentioned processes, the system for adjusting the angle of a camera 1 is achieved by a computer 10, an information terminal 100, and a camera 200 but may be achieved by an information terminal 100 and a camera 200. In this case, the processes that the computer 10 performs only have to be performed by any one of the information terminal 100 and the camera 200 or the both. The system for adjusting the angle of a camera 1 may be achieved by a computer 10 and a camera 200. In this case, the processes that the information terminal 100 performs only have to be performed by any one of the computer 10 and the camera 200 or the both. The process related to the image analysis that the camera 200 performs only has to be performed by any one of the computer 10 and the information terminal 100 or the both.

To achieve the means and the functions that are described above, a computer (including a CPU, an information processor, and various terminals) reads and executes a predetermined program. For example, the program may be provided from a computer through a network, specifically, through Software as a Service (SaaS) or may be provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

1 System for adjusting the angle of a camera
10 Computer
100 Information terminal
200 Camera

What is claimed is:

1. A system for adjusting an angle of a camera capable of imaging an object at different directions, comprising:
a memory device; and
a processor that:
acquires an image of each of a plurality of objects taken by a camera including a device for adjusting an angle of the camera;
acquires an angle of the camera when the image of each object is taken, the angle of camera being defined as an angle between a line corresponding to a plane including a floor or ground and a line connecting a center position of an imaging location in the camera and a predetermined point of the plane;
analyzes the image to identify each object an included in the image;
stores, to the memory device, the angle of the camera acquired when the image of the identified object is taken in association with the identified object, a plurality of angles of the camera being stored in the memory device in association with the plurality of objects, respectively;
receives a request including identification information of a target object from an information terminal;
identifies the target object based on the identification information included in the request;
extracts an angle of the camera which is stored in association with the target object from the memory device in response to the request; and
adjusts an angle of the camera for imaging the target object to the extracted angle.

2. A method for adjusting an angle of a camera capable of imaging an object at different directions, comprising:
acquiring an image of each of a plurality of objects taken by the camera;
acquiring an angle of the camera when the image of each object is taken, the angle of camera being defined as an angle between a line corresponding to a plane including a floor or ground and a line connecting a center position of an imaging location in the camera and a predetermined point of the plane;
analyzing the image to identify each object an included in the image;
storing, to a memory device, the angle of the camera acquired when the image of the identified object is taken in association with the identified object, a plurality of angles of the camera being stored in the memory device in association with the plurality of objects, respectively;
receiving a request including identification information of a target object from an information terminal;
identifying the target object based on the identification information included in the request;
extracting an angle of the camera which is stored in association with the target object from the memory device in response to the request; and
adjusting an angle of the camera for imaging the target object to the extracted angle.

3. A computer program product for use in a system for adjusting an angle of a camera capable of imaging an object at different directions, comprising a non-transitory computer usable medium having a set of instructions physically embodied therein, the set of instructions including computer readable program code, which when executed by the system causes an information processing unit to execute the steps of:
acquiring an image of each of a plurality of objects taken by the camera;
acquiring an angle of the camera when the image of each object is taken, the angle of camera being defined as an angle between a line corresponding to a plane including a floor or ground and a line connecting a center position of an imaging location in the camera and a predetermined point of the plane;
analyzing the image to identify each object an included in the image;
storing, to a memory device, the angle of the camera acquired when the image of the identified object is taken in association with the identified object, a plurality of angles of the camera being stored in the memory device in association with the plurality of objects, respectively;

receiving a request including identification information of a target object from an information terminal;

identifying the target object based on the identification information included in the request;

extracting an angle of the camera which is stored in association with the target object from the memory device in response to the request; and adjusting an angle of the camera for imaging the target object to the extracted angle.

* * * * *